United States Patent
Okajima et al.

(10) Patent No.: US 11,192,554 B2
(45) Date of Patent: Dec. 7, 2021

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Noboru Okajima, Wako (JP); Tatsuya Iwasa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 334 days.

(21) Appl. No.: 16/477,921

(22) PCT Filed: Jan. 24, 2017

(86) PCT No.: PCT/JP2017/002289
§ 371 (c)(1),
(2) Date: Jul. 15, 2019

(87) PCT Pub. No.: WO2018/138768
PCT Pub. Date: Aug. 2, 2018

(65) Prior Publication Data
US 2019/0367034 A1 Dec. 5, 2019

(51) Int. Cl.
*B60W 30/18* (2012.01)
*B60W 30/10* (2006.01)
(Continued)

(52) U.S. Cl.
CPC ...... *B60W 30/18163* (2013.01); *B60W 10/18* (2013.01); *B60W 10/20* (2013.01);
(Continued)

(58) Field of Classification Search
CPC .......... B60W 30/18163; B60W 10/18; B60W 10/20; B60W 30/10; B60W 2554/00; B60W 2520/10; B60W 2710/18; B60W 2710/20
(Continued)

(56) References Cited

U.S. PATENT DOCUMENTS 9,950,740 B2 * 4/2018 Sato ....................... B60W 30/12
2016/0179092 A1 * 6/2016 Park ..................... G05D 1/0088
701/23

(Continued)

FOREIGN PATENT DOCUMENTS

EP       2982565 A2 * 2/2016   .......... B60W 30/143
JP       11-250400       9/1999
(Continued)

OTHER PUBLICATIONS

Jianqiang et al., "Target Vehicle Selection Based on Multi Features Fusion Method," 2010, Publisher: IEEE.*
(Continued)

*Primary Examiner* — Tuan C To
(74) *Attorney, Agent, or Firm* — Amin, Turocy & Watson, LLP

(57) ABSTRACT

A vehicle control system includes a nearby information acquirer that acquires nearby information of an own vehicle, an automated driving controller that automatically selects and executes a first automated driving mode in which lane change is at least partially automatically performed and a second automated driving mode in which lane change is not automatically performed on the basis of the nearby information of the own vehicle acquired by the nearby information acquirer, and a notification controller that causes an output unit to output information prompting switching to manual driving at a position before a branch point when a (Continued)

condition is satisfied, the condition including that during execution of the second automated driving mode there is a branch point for entering a branch road from a main line when the own vehicle is traveling along a predetermined route.

12 Claims, 5 Drawing Sheets

(51) Int. Cl.
*B60W 10/20* (2006.01)
*B60W 10/18* (2012.01)

(52) U.S. Cl.
CPC ......... *B60W 30/10* (2013.01); *B60W 2520/10* (2013.01); *B60W 2554/00* (2020.02); *B60W 2710/18* (2013.01); *B60W 2710/20* (2013.01)

(58) Field of Classification Search
USPC .......................................................... 701/25
See application file for complete search history.

(56) References Cited

U.S. PATENT DOCUMENTS

| | | | |
|---|---|---|---|
| 2016/0209841 A1* | 7/2016 | Yamaoka | ............... B60W 30/00 |
| 2016/0347327 A1 | 12/2016 | Kondo et al. | |
| 2016/0362113 A1* | 12/2016 | Takaso | ................. G05D 1/0255 |
| 2017/0151950 A1* | 6/2017 | Lien | .................. B60W 50/0098 |
| 2017/0176989 A1* | 6/2017 | Hay | ...................... G05D 1/0278 |
| 2019/0001994 A1* | 1/2019 | Isaji | ...................... B60W 10/18 |

FOREIGN PATENT DOCUMENTS

| | | | |
|---|---|---|---|
| JP | 2006-264635 | 10/2006 | |
| JP | 2011-131838 | 7/2011 | |
| JP | 2015-157604 | 9/2015 | |
| JP | 2015-205558 | 11/2015 | |
| JP | 2016-028927 | 3/2016 | |
| JP | 2016182906 A | * 10/2016 | |
| JP | 2017-036025 | 2/2017 | |
| KR | 20160076262 A | * 6/2016 | .......... B60W 30/182 |
| KR | 20160118182 A | * 10/2016 | |
| WO | 2016/181725 | 11/2016 | |
| WO | WO-2016199379 A1 | * 12/2016 | ............ B60W 10/20 |

OTHER PUBLICATIONS

Wen et al., "Lane Change Trajectory Prediction by Using Recorded Human Driving Data," 2013, Publisher: IEEE.*
International Search Report and Written Opinion for International Application No. PCT/JP2017/002289 dated May 9, 2017, 10 pgs.

* cited by examiner

VEHICLE CONTROL SYSTEM, VEHICLE CONTROL METHOD, AND VEHICLE CONTROL PROGRAM

TECHNICAL FIELD

The present invention relates to a vehicle control system, a vehicle control method, and a vehicle control program.

BACKGROUND ART

In recent years, research on a technology for controlling an own vehicle such that it automatically travels along a route to a destination has advanced. In this regard, an automated driving support system including a non-execution reason acquiring means that acquires the reason why automated driving control has not been executed when no automated driving control has been executed during traveling in an automated driving section which permits automated driving control of vehicles and a non-execution reason guidance means that provides guidance of the non-execution reason acquired by the non-execution reason acquiring means is known (see, for example, Patent Document 1).

CITATION LIST

Patent Literature

[Patent Document 1]
Japanese Unexamined Patent Application, First Publication No. 2016-28927

SUMMARY OF INVENTION

Technical Problem

However, providing notification to prompt manual driving on the premise that there are both an automated driving mode in which lane change is performed and an automated driving mode in which no lane change is performed is not taken into consideration in the related art.

The present invention has been made in view of the above circumstances and it is an object of the present invention to provide a vehicle control system, a vehicle control method, and a vehicle control program which can appropriately provide notification to prompt manual driving on the basis of a driving mode that is being executed in a vehicle.

Solution to Problem

According to an aspect, a vehicle control system includes a nearby information acquirer configured to acquire nearby information of an own vehicle, an automated driving controller configured to automatically select and execute a first automated driving mode in which lane change is at least partially automatically performed and a second automated driving mode in which lane change is not automatically performed on the basis of the nearby information of the own vehicle acquired by the nearby information acquirer, and a notification controller configured to cause an output unit to output information prompting switching to manual driving at a position before a branch point when a condition is satisfied, the condition including that during execution of the second automated driving mode there is a branch point for entering a branch road from a main line when the own vehicle is traveling along a predetermined route.

According to another aspect, the condition includes no other vehicles traveling in a lane connected to the branch road.

According to another aspect, the condition includes the own vehicle not traveling in a lane connected to the branch road.

According to another aspect, the automated driving controller is configured to select the second automated driving mode when the own vehicle is traveling at a reference speed or less.

According to another aspect, the automated driving controller is configured to further select the second automated driving mode when it is determined that congestion has occurred near the own vehicle on the basis of the nearby information of the own vehicle.

According to another aspect, the position before the branch point is a position that is a predetermined distance before the branch point or a position that is a distance, which is determined with reference to the branch point according to a speed of the own vehicle, before the branch point.

According to another aspect, the position before the branch point is a position that, on the basis of the speed of the own vehicle, the own vehicle is expected to reach a predetermined time before the own vehicle is expected to reach the branch point.

According to another aspect, a vehicle control method including an in-vehicle computer acquiring nearby information of an own vehicle, automatically selecting and executing a first automated driving mode in which lane change is at least partially automatically performed and a second automated driving mode in which lane change is not automatically performed on the basis of the acquired nearby information of the own vehicle, and causing an output unit to output information prompting switching to manual driving at a position before a branch point when a condition is satisfied, the condition including that during execution of the second automated driving mode there is a branch point for entering a branch road from a main line when the own vehicle is traveling along a predetermined route.

According to another aspect, a vehicle control program causing an in-vehicle computer to acquire nearby information of an own vehicle, automatically select and execute a first automated driving mode in which lane change is at least partially automatically performed and a second automated driving mode in which lane change is not automatically performed on the basis of the acquired nearby information of the own vehicle, and cause an output unit to output information prompting switching to manual driving at a position before a branch point when a condition is satisfied, the condition including that during execution of the second automated driving mode there is a branch point for entering a branch road from a main line when the own vehicle is traveling along a predetermined route.

Advantageous Effects of Invention

According to another aspect, it is possible to more appropriately provide notification of information prompting manual driving on the basis of a driving mode that is being executed in a vehicle.

DESCRIPTION OF EMBODIMENTS

Hereinafter, embodiments of a vehicle control system, a vehicle control method, and a vehicle control program of the present invention will be described with reference to the drawings.

Figure 1:
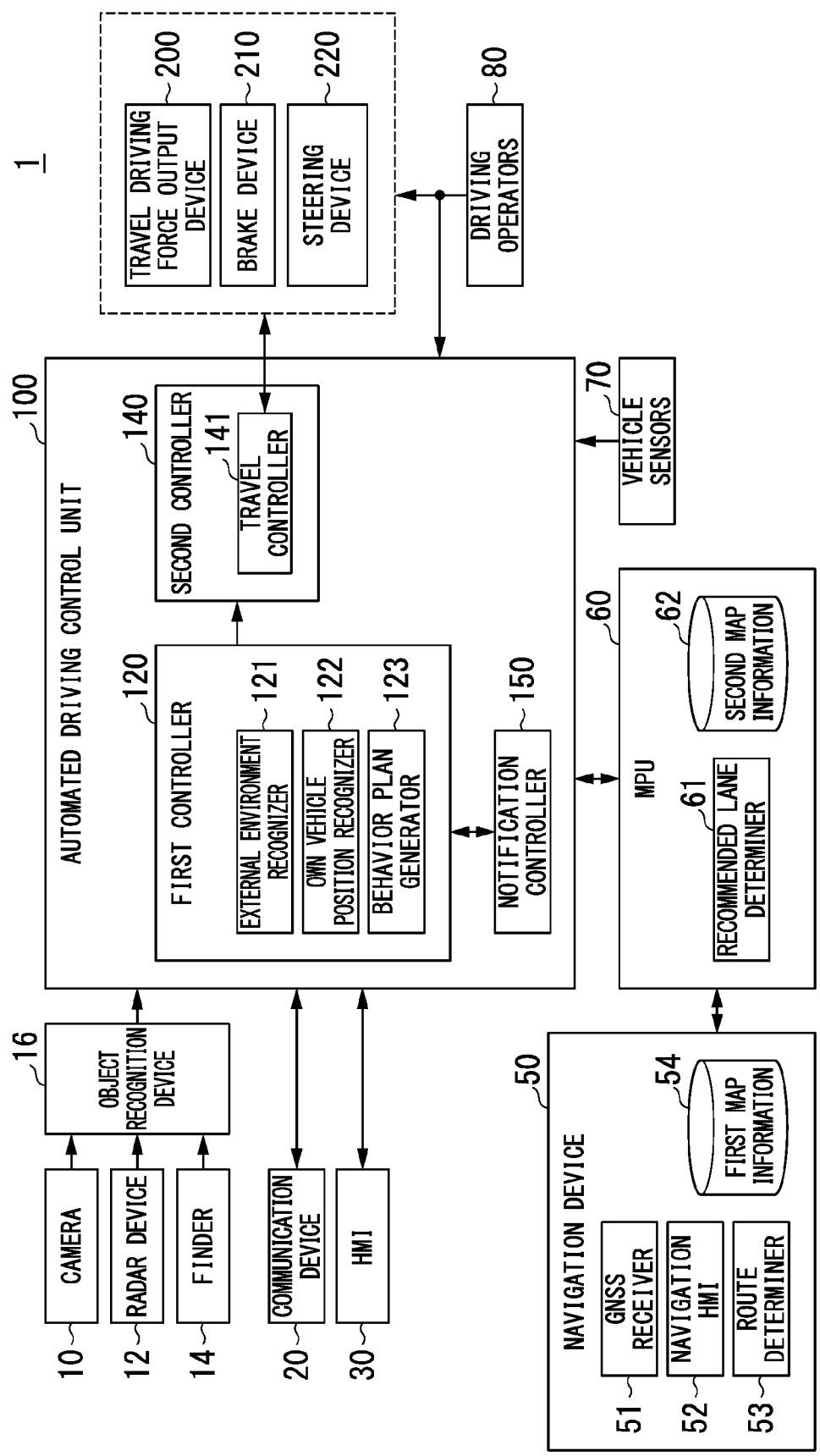
FIG. 1 is a block diagram of a vehicle system including an automated driving control unit.

FIG. 1 is a configuration diagram of a vehicle system 1 including an automated driving control unit 100. A vehicle in which the vehicle system 1 is mounted is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a generator connected to the internal combustion engine or using discharge power of a secondary battery or a fuel cell.

The vehicle system 1 includes, for example, a camera 10, a radar device 12, a finder 14, an object recognition device 16, a communication device 20, a human machine interface (HMI) 30, a navigation device 50, a micro-processing unit (MPU) 60, vehicle sensors 70, driving operators 80, an automated driving control unit 100, a travel driving force output device 200, a brake device 210, and a steering device 220. These devices or apparatuses are connected to each other by a multiplex communication line or a serial communication line such as a controller area network (CAN) communication line, a wireless communication network, or the like. The components shown in FIG. 1 are merely an example and some of the components may be omitted or other components may be added.

The camera 10 is, for example, a digital camera using a solid-state imaging device such as a charge coupled device (CCD) or a complementary metal oxide semiconductor (CMOS). One or a plurality of cameras 10 are attached to the vehicle in which the vehicle system 1 is mounted (hereinafter referred to as an own vehicle M) at arbitrary locations. For imaging the area in front of the own vehicle M, a camera 10 is attached to an upper portion of a front windshield, a rear surface of a rearview mirror, or the like. For example, the camera 10 repeats imaging of the surroundings of the own vehicle M at regular intervals. The camera 10 may also be a stereo camera.

The radar device 12 radiates radio waves such as millimeter waves around the own vehicle M and detects radio waves reflected by an object (reflected waves) to detect at least the position (distance and orientation) of the object. One or a plurality of radar devices 12 may be attached to the own vehicle M at arbitrary locations. The radar device 12 may detect the position and speed of an object using a frequency modulated continuous wave (FM-CW) method.

The finder 14 is a light detection and ranging or laser imaging detection and ranging (LIDAR) finder which measures scattered light from an object in response to illuminated light to detect the distance to the object. One or a plurality of finders 14 may be attached to the own vehicle M at arbitrary locations.

The object recognition device 16 performs a sensor fusion process on results of detection by some or all of the camera 10, the radar device 12, and the finder 14 to recognize the position, type, speed, or the like of the object. The object recognition device 16 outputs the recognition result to the automated driving control unit 100.

For example, the communication device 20 communicates with other vehicles near the own vehicle M using a cellular network, a Wi-Fi network, Bluetooth (registered trademark), dedicated short range communication (DSRC) or the like or communicates with various server devices via wireless base stations.

The HMI 30 presents various types of information to an occupant in the own vehicle M and receives an input operation from the occupant. The HMI 30 includes various display devices, speakers, buzzers, touch panels, switches, keys, or the like.

The navigation device 50 includes, for example, a global navigation satellite system (GNSS) receiver 51, a navigation HMI 52, and a route determiner 53 and holds first map information 54 in a storage device such as a hard disk drive (HDD) or a flash memory. The GNSS receiver specifies the position of the own vehicle M on the basis of signals received from GNSS satellites. The position of the own vehicle M may also be specified or supplemented by an inertial navigation system (INS) using the output of the vehicle sensors 70. The navigation HMI 52 includes a display device, a speaker, a touch panel, a key, or the like. The navigation HMI 52 may be partly or wholly shared with the HMI 30 described above. For example, the route determiner 53 determines a route from the position of the own vehicle M specified by the GNSS receiver 51 (or an arbitrary input position) to a destination input by the occupant using the navigation HMI 52 by referring to the first map information 54. The first map information 54 is, for example, information representing shapes of roads by links indicating roads and nodes connected by the links. The first map information 54 may include curvatures of roads, point of interest (POI) information, or the like. The route determined by the route determiner 53 is output to the MPU 60. The navigation device 50 may also perform route guidance using the navigation HMI 52 on the basis of the route determined by the route determiner 53. The navigation device 50 may be implemented, for example, using a function of a terminal device such as a smartphone or a tablet possessed by the user. The navigation device 50 may also transmit the current position and the destination to a navigation server via the communication device 20 and acquire a route returned from the navigation server.

The MPU 60 functions, for example, as a recommended lane determiner 61 and holds the second map information 62 in a storage device such as an HDD or a flash memory. The recommended lane determiner 61 divides the route provided from the navigation device 50 into a plurality of blocks (for example, into blocks each 100 meters long in the direction in which the own vehicle M travels) and determines a recommended lane for each block by referring to the second map information 62. The recommended lane determiner 61 determines the number of the lane from the left in which to travel. When there is a branch point, a merge point, or the like on the route, the recommended lane determiner 61 determines a recommended lane such that the own vehicle M can travel on a reasonable route for proceeding to the branch destination.

The second map information 62 is map information with higher accuracy than the first map information 54. The second map information 62 includes, for example, information of the centers of lanes or information of the boundaries of lanes. The second map information 62 may also include road information, traffic regulation information, address information (addresses/postal codes), facility information, telephone number information, or the like. The road information includes information indicating the types of roads such as expressways, toll roads, national roads, or prefectural roads or information such as the number of lanes of each road, the widths of lanes, the gradients of roads, the positions of roads (three-dimensional coordinates including longitude, latitude and height), the curvatures of curves of lanes, the positions of merge or branch points of lanes, signs installed on roads, or the like. The second map information 62 may be updated as needed by accessing another device using the communication device 20.

The vehicle sensors 70 include, for example, a vehicle speed sensor that detects the speed of the own vehicle M, an acceleration sensor that detects the acceleration thereof, a yaw rate sensor that detects an angular speed thereof about the vertical axis, an orientation sensor that detects the orientation of the own vehicle M, or the like.

The driving operators 80 include, for example, an accelerator pedal, a brake pedal, a shift lever, a steering wheel, and other operators. Sensors for detecting the amounts of operation or the presence or absence of operation are attached to the driving operators 80 and detection results thereof are output to either or both of the automated driving control unit 100 or the travel driving force output, brake, and steering devices 200, 210, and 220.

The automated driving control unit 100 includes, for example, a first controller 120, a second controller 140, and a notification controller 150. Each of the first controller 120, the second controller 140, and the notification controller 150 is implemented by a processor such as a central processing unit (CPU) executing a program (software). Some or all of the functional units of the first controller 120, the second controller 140, and the notification controller 150 which will be described below may be implemented by hardware such as a large scale integration (LSI), an application specific integrated circuit (ASIC), or a field-programmable gate array (FPGA) or may be implemented by hardware and software in cooperation.

The first controller 120 includes, for example, an external environment recognizer 121, an own vehicle position recognizer 122, and a behavior plan generator 123.

The external environment recognizer 121 recognizes states of a nearby vehicle(s) such as the position, speed and acceleration thereof on the basis of information that is input from the camera 10, the radar device 12, and the finder 14 directly or via the object recognition device 16. The position of the nearby vehicle may be represented by a representative point such as a center of gravity or a corner of the nearby vehicle or may be represented by a region expressed by a contour of the nearby vehicle. The "states" of the nearby vehicle may include an acceleration or jerk of the nearby vehicle or a "behavior state" (for example, whether or not the nearby vehicle is changing or is going to change lanes). The external environment recognizer 121 may also recognize the positions of guardrails or utility poles, parked vehicles, pedestrians, and other objects in addition to nearby vehicles. The nearby vehicles include vehicles present in a lane in which the own vehicle M is traveling and a lane adjacent to the lane.

In addition, the external environment recognizer 121 determines whether or not another vehicle is traveling in a lane in which the own vehicle M is going to travel (for example, a lane to which lane change is to be performed and which is connected to a branch road). The state in which another vehicle is traveling in a lane in which the own vehicle M is going to travel corresponds to that in which the distance between the other vehicle present in the lane in which the own vehicle M is going to travel and the own vehicle is within a predetermined distance. The predetermined distance is, for example, a distance which is set according to the relative speed between the own vehicle M and the nearby vehicle and at which the own vehicle M can safely change lanes to the lane to which lane change is to be performed.

Further, the external environment recognizer 121 determines whether or not congestion has occurred near the own vehicle M and outputs the determination result to the notification controller 150. The definition of congestion may be set arbitrarily. For example, congestion is defined such that the average speed of vehicles near the own vehicle M is equal to or less than a predetermined speed or that the average inter-vehicle distance between vehicles near the own vehicle M is equal to or less than a predetermined distance. Congestion may also be defined such that the own vehicle M or a nearby vehicle intermittently accelerates/decelerates. Congestion may also be defined such that the distance between the own vehicle M and a nearby vehicle is within a predetermined distance and the own vehicle M or the nearby vehicle intermittently accelerates/decelerates.

The own vehicle position recognizer 122 recognizes, for example, a (traveling) lane in which the own vehicle M is traveling and the relative position and attitude of the own vehicle M with respect to the traveling lane. The own vehicle position recognizer 122 recognizes the traveling lane, for example, by comparing a pattern of road lane lines (for example, an arrangement of solid and broken lines) obtained from the second map information 62 with a pattern of road lane lines near the own vehicle M recognized from an image captured by the camera 10. This recognition may be performed taking into consideration a position of the own vehicle M acquired from the navigation device 50 or a result of processing by the INS.

Figure 2:
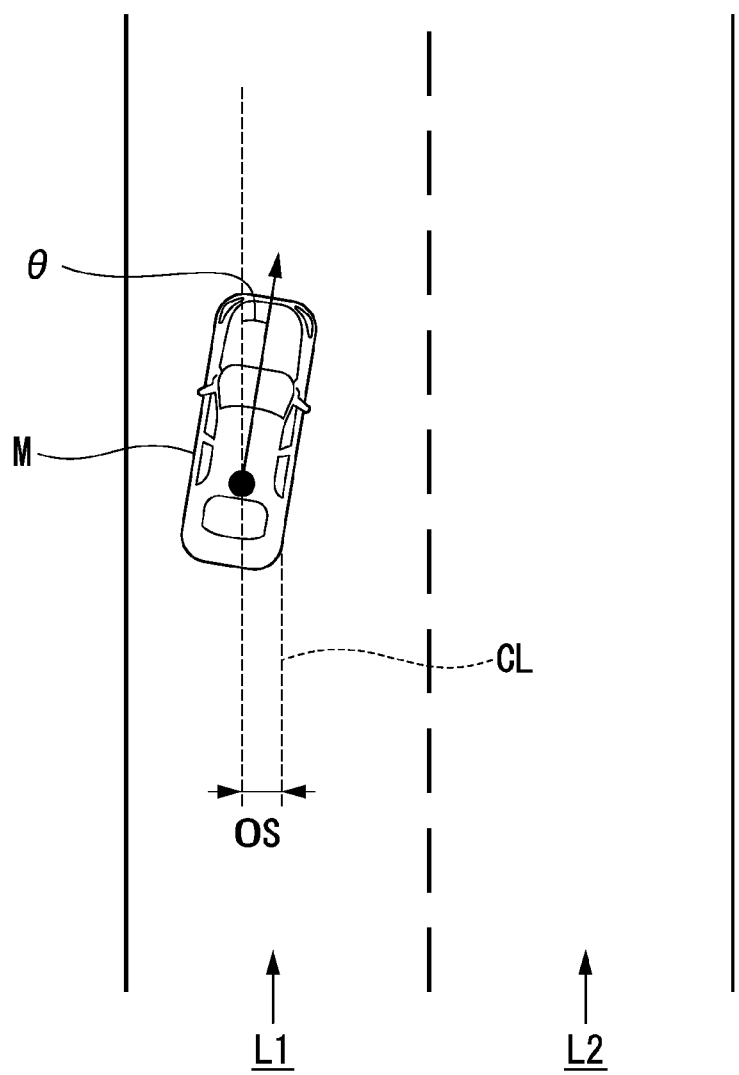
FIG. 2 is a diagram showing how the relative position and attitude of an own vehicle M with respect to a traveling lane are recognized by an own vehicle position recognizer.

Then, the own vehicle position recognizer 122 recognizes, for example, the position or attitude of the own vehicle M with respect to the traveling lane. FIG. 2 is a diagram showing how the relative position and attitude of the own vehicle M with respect to the traveling lane L1 are recognized by the own vehicle position recognizer 122. For example, the own vehicle position recognizer 122 recognizes both a deviation OS from a traveling lane center CL of a reference point (for example, the center of gravity) of the own vehicle M and an angle θ formed by the travel direction of the own vehicle M relative to an extension line of the traveling lane center CL as the relative position and attitude of the own vehicle M with respect to the traveling lane L1. Alternatively, the own vehicle position recognizer 122 may recognize the position of the reference point of the own vehicle M with respect to one of the sides of the own lane L1 or the like as the relative position of the own vehicle M with respect to the traveling lane. The relative position of the own vehicle M recognized by the own vehicle position recognizer 122 is provided to the recommended lane determiner 61 and the behavior plan generator 123.

The behavior plan generator 123 determines events which are to be sequentially performed in the automated driving such that the own vehicle M travels in the recommended lane determined by the recommended lane determiner 61 and copes with situations occurring near the own vehicle M. Examples of the events include a constant-speed travel event which is an event of traveling in the same traveling lane at a constant speed, a following travel event which is an event of following a preceding vehicle, a lane change event, a merging event, a branching event, an emergency stop event, and a handover event which is an event of terminating automated driving and switching to manual driving. During execution of these events, behaviors for avoidance may sometimes be planned on the basis of situations occurring near the own vehicle M (such as the presence of nearby vehicles and pedestrians or lane narrowing due to road construction).

The behavior plan generator 123 generates a target trajectory along which the own vehicle M will travel in the future. The target trajectory includes, for example, a speed element. For example, the target trajectory is generated as a set of target points (trajectory points) to be reached at a plurality of future reference times which are set at intervals of a predetermined sampling time (for example, about tenths of a second). Therefore, when the interval between trajectory points is great, this means that the vehicle travels at a high speed in the section between the trajectory points.

Figure 3:
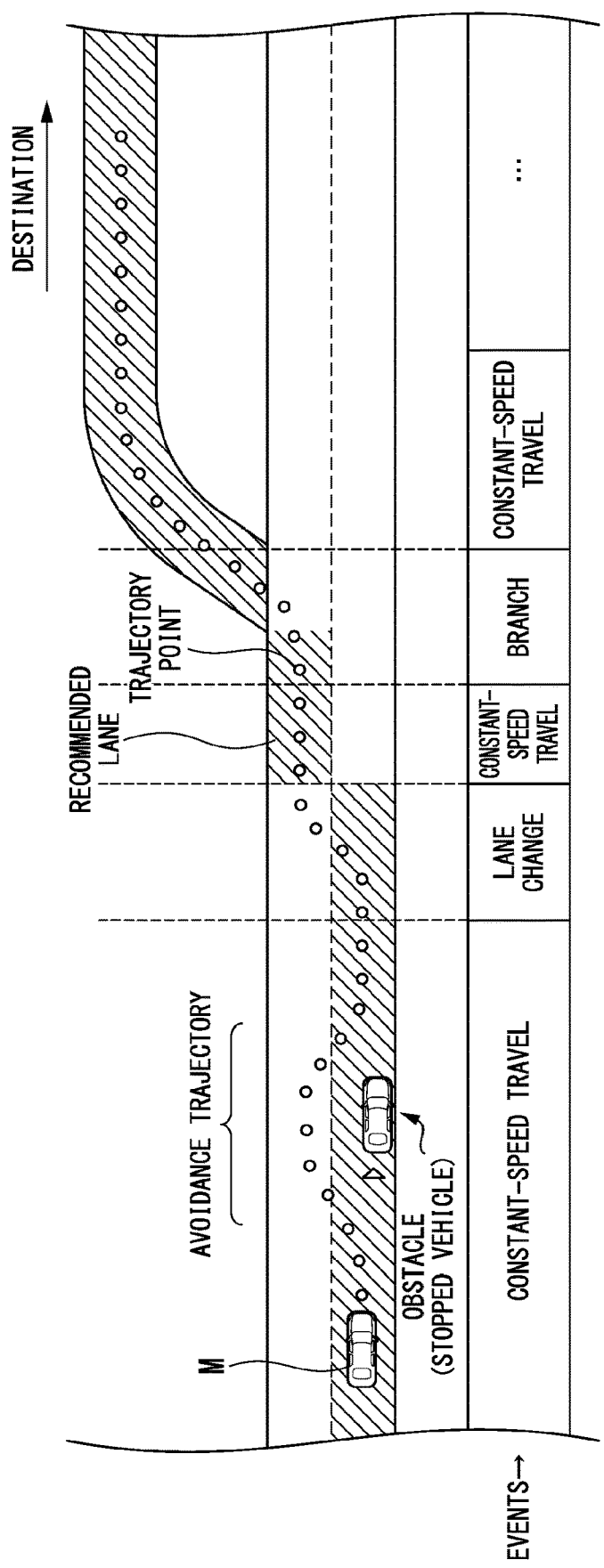
FIG. 3 is a diagram showing how a target trajectory is generated on the basis of a recommended lane.

FIG. 3 is a diagram showing how a target trajectory is generated on the basis of a recommended lane. As shown, the recommended lane is set to be convenient for traveling along the route to the destination. When the own vehicle M approaches a predetermined distance (which may be determined according to the types of events) before a point for switching to the recommended lane, the behavior plan generator 123 activates a lane change event, a branching event, a merging event, or the like. When it becomes necessary to avoid an obstacle during execution of each event, an avoidance trajectory is generated as shown in FIG. 3.

For example, the behavior plan generator 123 generates a plurality of candidate target trajectories and selects an optimum target trajectory at a given point in time from the viewpoint of safety and efficiency. The second controller 140 includes a travel controller 141. The travel controller 141 controls the travel driving force output device 200, the brake device 210, and the steering device 220 such that the own vehicle M passes along the target trajectory generated by the behavior plan generator 123 at scheduled times.

Here, the automated driving which is performed mainly by the first controller 120 is executed in one of a plurality of automated driving modes. The automated driving modes include an automated driving mode which is executed at a reference speed (for example, 60 km/h) or less (an example of the "second automated driving mode"). An example of this is a low speed following travel (traffic jam pilot: TJP) in which the own vehicle M follows a preceding vehicle at the time of congestion. In the low speed following travel, safe automated driving can be realized by following a preceding vehicle on a congested freeway.

In the low speed following travel, lane change of the own vehicle M by the behavior plan generator 123 is prohibited. This is because congested vehicles block recognition of the nearby situation of the own vehicle M (in particular, the presence of two-wheeled vehicles overtaking the own vehicle M from behind the own vehicle M). The low speed following travel is canceled, for example, when the travel speed of the own vehicle M exceeds the reference speed. The low speed following travel is another example of the "second automated driving mode."

In an automated driving mode implemented when the own vehicle M travels at a speed higher than the reference speed, the own vehicle M can change lanes according to events, which are sequentially executed in automated driving, and the nearby situation of the own vehicle M. This is because when the own vehicle M travels at the speed higher than the reference speed, a certain distance or more is secured as the inter-vehicle distance between the own vehicle M and nearby vehicles and the own vehicle M can recognize its nearby situation without being blocked by other vehicles m. The automated driving mode implemented when the own vehicle M is traveling at a speed higher than a reference speed is an example of the "first automated driving mode." The reference speeds used when the "first automated driving mode" and the "second automated driving mode" are performed may be different. The first automated driving mode may be an automated driving mode in which lane change is partially automatically performed. Here, "partially" indicates that a series of operations from the start to the end of lane change are partially performed by automated driving or that the driver's operation (for example, steering control or acceleration/deceleration control) is assisted when the driver performs an operation to change lanes.

The notification controller 150 performs predetermined processing which will be described later with reference to FIG. 4 to cause an output unit (not shown) included in the HMI 30 or the navigation HMI 52 to output predetermined information. The "vehicle control system" includes an external environment recognizer 121, an own vehicle position recognizer 122, a behavior plan generator 123, a travel controller 141, and a notification controller 150.

The travel driving force output device 200 outputs a travel driving force (torque) required for the vehicle to travel to driving wheels. The travel driving force output device 200 includes, for example, a combination of an internal combustion engine, an electric motor, a transmission, and the like and an ECU that controls them. The ECU controls the above constituent elements according to information input from the travel controller 141 or information input from the driving operators 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the travel controller 141 or information input from the driving operator 80 such that a brake torque associated with a braking operation is output to each wheel. The brake device 210 may include, as a backup, a mechanism for transferring a hydraulic pressure generated by an operation of the brake pedal included in the driving operators 80 to the cylinder via a master cylinder. The brake device 210 is not limited to that configured as described above and may be an electronically controlled hydraulic brake device that controls an actuator according to information input from the travel controller 141 and transmits the hydraulic pressure of the master cylinder to the cylinder.

The steering device 220 includes, for example, a steering ECU and an electric motor. The electric motor, for example, applies a force to a rack-and-pinion mechanism to change the direction of the steering wheel. The steering ECU drives the electric motor according to information input from the travel controller 141 or information input from the driving operators 80 to change the direction of the steering wheels.

Figure 4:
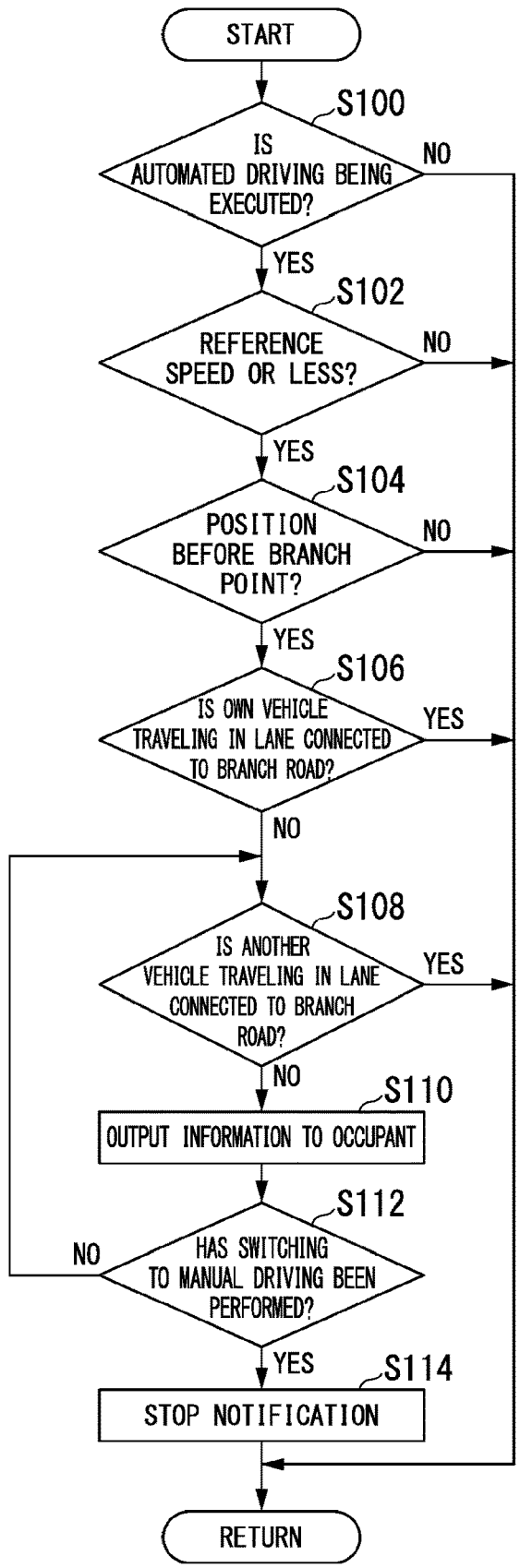
FIG. 4 is a flowchart showing a flow of processing executed by the vehicle system 1 mounted in the vehicle.

FIG. 4 is a flowchart showing a flow of processing executed by the vehicle system 1 mounted in the own vehicle M. A specific scenario relating to this processing will be described below with reference to FIG. 5 which will be described later. First, the notification controller 150 determines whether or not the own vehicle M is executing automated driving (step S100). If the own vehicle M is not executing automated driving, the processing of this flowchart ends. If the own vehicle M is executing automated driving, the notification controller 150 determines whether or not the own vehicle M is traveling at a reference speed or less (step S102). Here, the own vehicle M travels at the reference speed or less, for example, when a low speed following travel is being executed. In step S102, the notification controller 150 may determine whether or not the own vehicle M is executing an automated driving mode in which no lane change is performed (for example, whether or not it is executing a low speed following travel) instead of determining whether or not the own vehicle M is traveling at the reference speed or less.

If the own vehicle M is not traveling at the reference speed or less, the processing of this flowchart ends. If the own vehicle M is traveling at the reference speed or less, the notification controller 150 determines whether or not the own vehicle M has reached a position before a branch point (details of which will be described later) (step S104). If the own vehicle M has not reached a position before a branch point, the processing of this flowchart ends.

If the own vehicle M has reached a position before a branch point, the notification controller 150 determines whether or not the own vehicle M is traveling in a lane connected to a branch road (step S106). If the own vehicle M is traveling in a lane connected to a branch road, the processing of this flowchart ends. If the own vehicle M is not traveling in a lane connected to a branch road, the notification controller 150 determines whether or not another vehicle m is traveling in a lane connected to a branch road (step S108). If another vehicle m is traveling in a lane connected to a branch road (if the distance between the other vehicle m and the own vehicle M is within a predetermined distance), the processing of this flowchart ends.

On the other hand, if the other vehicle m is not traveling in a lane connected to a branch road (if the distance between the other vehicle m and the own vehicle M exceeds the predetermined distance), the notification controller 150 causes the HMI 30 to output predetermined information (step S110). The predetermined information is information prompting manual driving (a so-called "takeover request (TOR)"), information prompting lane change, or information prompting lane change by manual driving. Hereinafter, it is assumed that information prompting manual driving is output in step S110.

Next, the notification controller 150 determines whether or not switching to manual driving has been performed (step S112). If switching to manual driving has not been performed, the processing returns to the process of step S108. If switching to manual driving has not been performed, the processing may also return to the process of step S100. If switching to manual driving has been performed, the notification controller 150 stops outputting the information prompting manual driving (step S114). Then, the processing of one routine of this flowchart ends.

In the above processing, the process of step S108 may be omitted. In this case, the notification controller 150 causes the HMI 30 to output predetermined information without determining whether or not another vehicle m is traveling in a lane connected to a branch road. This is because when the own vehicle M is traveling at the reference speed or less or when the own vehicle M is traveling at the reference speed or less and has reached the position before the branch point, there is a high probability that there will be a vehicle in the lane connected to the branch road and thus it is necessary to notify the driver of predetermined information.

Figure 5:
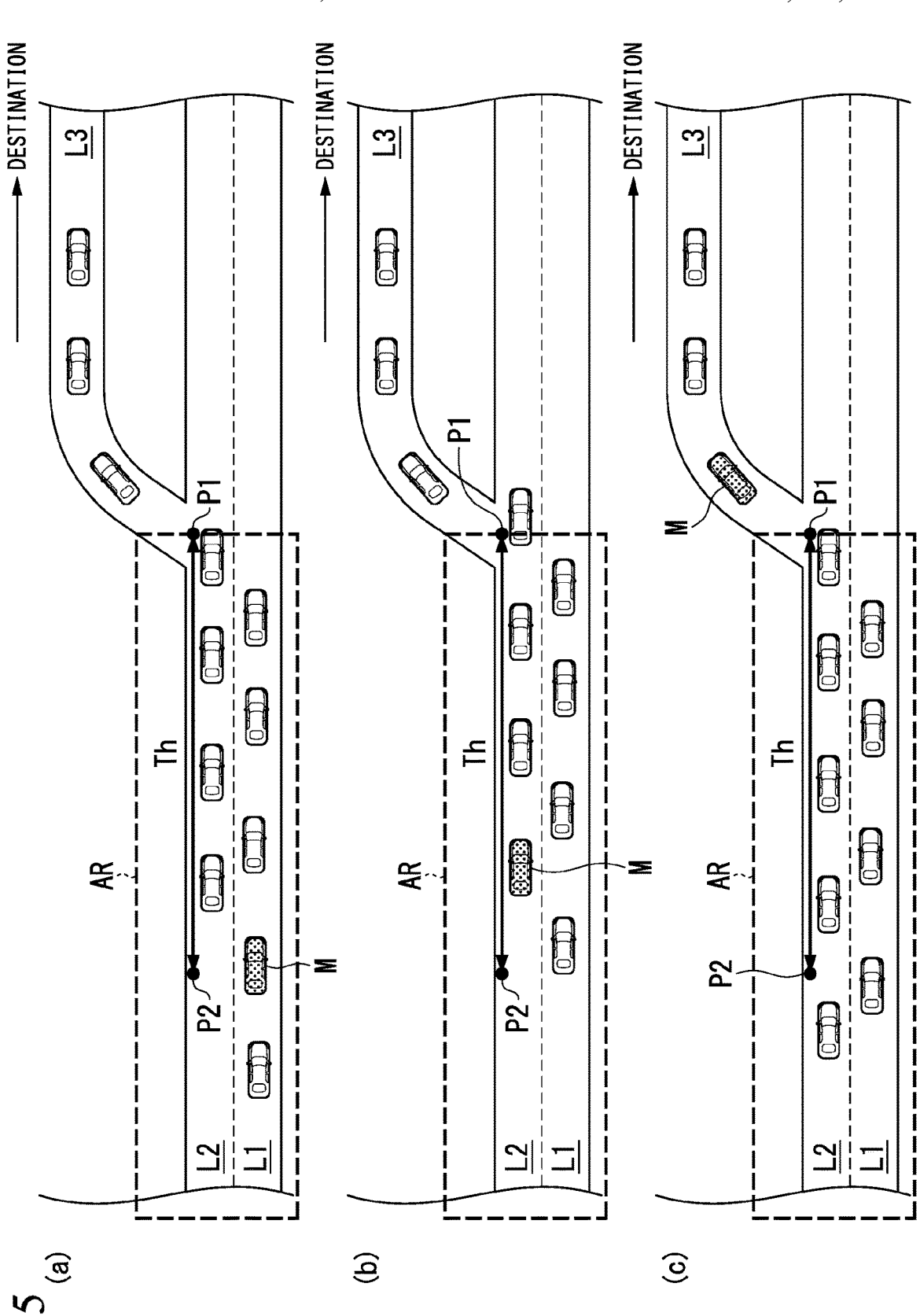
FIG. 5(a)-(c) is a diagram showing an example of a scenario in which information prompting manual driving is output.

FIG. 5 is a diagram showing an example of a scenario in which information prompting manual driving is output. In the example shown to FIG. 5 (a), it is assumed that the own vehicle M is traveling in a lane L1 and there is a branch road L3 toward the destination of the own vehicle M. A lane L2 adjacent to the lane L1 is connected to the branch road L3. It is assumed that, in such an environment, there is vehicle congestion in a predetermined section AR before a branch point P1 at which the lane L2 and the branch road L3 are connected.

In a state in which the own vehicle M is traveling in the lane L1 during automated driving, the own vehicle M may enter the congested section AR and travel at a reference speed or less. In this case, to enter the branch road L3, it is necessary to change lanes to the lane L2 in the section AR. However, for example, when the own vehicle M is traveling at the reference speed or less, the own vehicle M may not be able to change lanes by automated driving since the low speed following travel is being executed. In this case, if no other vehicles m are traveling in the lane L2 at a point P2 before a branch point (details of which will be described later), the notification controller 150 causes the HMI 30 to output information prompting manual driving to cause the own vehicle M to change lanes to the lane L2 by manual driving. Thus, the occupant of the own vehicle M becomes aware that it is traveling in a lane different from the lane connected to the branch road and manually drives the own vehicle M to change lanes as shown in FIG. 5 (b). Then, after the lane change, the occupant can cause the own vehicle M to advance from the branch point P1 to the lane L3 to travel toward the destination as shown in FIG. 5(c).

After the lane change, the own vehicle M may start automated driving and automatically advance from the branch point P1 to the lane L3 under the control of the automated driving control unit 100. In this case, for example, the automated driving mode which is executed at the reference speed or less (the second automated driving mode) prohibits lane change by the behavior plan generator 123, but permits lane change to a lane branching from the lane in which the own vehicle M is traveling.

The position before the branch point is, for example, a position (P2 in the drawing) at which the own vehicle M is a predetermined distance Th (for example, 2 km) before the branch point P1. The position before the branch point may also be a position that is a distance, which is determined with reference to the branch point P1 according to the speed of the own vehicle, before the branch point. Here, the actual position of the own vehicle M or a position of the own vehicle M virtually set in the lane L2 may be used as a reference point of the own vehicle M. The position before the branch point may also be a position that, on the basis of the speed of the own vehicle M, the own vehicle M is expected to reach a predetermined time before the own vehicle M is expected to reach the branch point P1.

According to the embodiment described above, the vehicle system 1 includes the automated driving controller (the automated driving control unit 100) configured to automatically select and execute a first automated driving mode in which lane change is at least partially automatically performed and a second automated driving mode in which lane change is not automatically performed on the basis of nearby information of the own vehicle M acquired by the external environment recognizer 121, and the notification controller configured to cause an output unit to output information prompting switching to manual driving at a position before a branch point when a condition is satisfied, the condition including that during execution of the second automated driving mode there is a branch point for entering a branch road from a main line when the own vehicle M is traveling along a predetermined route, whereby it is possible to more appropriately provide notification to prompt manual driving on the basis of a driving mode that is being executed in the vehicle.

Although the modes for carrying out the present invention have been described above by way of embodiments, the present invention is not limited to these embodiments at all and various modifications and substitutions can be made without departing from the gist of the present invention.

REFERENCE SIGNS LIST

1 Vehicle system
100 Automated driving control unit
120 Controller
121 External environment recognizer
121A Acquirer
121B Determination processor
121C Storage unit
122 Own vehicle position recognizer
123 Behavior plan generator
141 Traveling controller
150 Notification controller

What is claimed is:

1. A vehicle control system comprising:
a nearby information acquirer configured to acquire nearby information of an own vehicle;
an automated driving controller configured to automatically select and execute a first automated driving mode in which lane change is at least partially automatically performed and a second automated driving mode in which lane change is not automatically performed on the basis of the nearby information of the own vehicle acquired by the nearby information acquirer; and
a notification controller configured to cause an output unit to output information prompting switching to manual driving at a position before a branch point when a condition is satisfied, the condition including that during execution of the second automated driving mode there is a branch point for entering a branch road from a main line when the own vehicle is traveling along a predetermined route,
wherein the condition includes that other vehicles are not traveling in a lane connected to the branch road, the own vehicle is not traveling in a lane connected to the branch road, or neither other vehicles nor the own vehicle are traveling in a lane connected to the branch road.

2. The vehicle control system according to claim 1, wherein the automated driving controller is configured to select the second automated driving mode when the own vehicle is traveling at a reference speed or less.

3. The vehicle control system according to claim 2, wherein the automated driving controller is configured to further select the second automated driving mode when it is determined that congestion has occurred near the own vehicle on the basis of the nearby information of the own vehicle.

4. The vehicle control system according to claim 1, wherein the position before the branch point is a position that is a predetermined distance before the branch point or a position that is a distance, which is determined with reference to the branch point according to a speed of the own vehicle, before the branch point.

5. The vehicle control system according to claim 1, wherein the position before the branch point is a position that, on the basis of a speed of the own vehicle, the own vehicle is expected to reach a predetermined time before the own vehicle is expected to reach the branch point.

6. A vehicle control system comprising:
a nearby information acquirer configured to acquire nearby information of an own vehicle;
an automated driving controller configured to automatically select and execute a first automated driving mode in which lane change is at least partially automatically performed and a second automated driving mode in which lane change is not automatically performed on the basis of the nearby information of the own vehicle acquired by the nearby information acquirer; and
a notification controller configured to cause an output unit to output information prompting switching to manual driving at a position before a branch point when a condition is satisfied, the condition including that during execution of the second automated driving mode there is a branch point for entering a branch road from a main line when the own vehicle is to travel along a predetermined route,
wherein the automated driving controller is configured to select the second automated driving mode when the own vehicle is traveling at a reference speed or less or when it is determined that congestion has occurred near the own vehicle on the basis of the nearby information of the own vehicle.

7. The vehicle control system according to claim 6, wherein the condition includes no other vehicles traveling in a lane connected to the branch road.

8. The vehicle control system according to claim 6, wherein the condition includes the own vehicle not traveling in a lane connected to the branch road.

9. The vehicle control system according to claim 7, wherein the condition includes the own vehicle not traveling in a lane connected to the branch road.

10. The vehicle control system according to claim 6, wherein the position before the branch point is a position that is a predetermined distance before the branch point or a position that is a distance, which is determined with reference to the branch point according to a speed of the own vehicle, before the branch point.

11. The vehicle control system according to claim 6, wherein the position before the branch point is a position that, on the basis of a speed of the own vehicle, the own vehicle is expected to reach a predetermined time before the own vehicle is expected to reach the branch point.

12. A vehicle control method using a vehicle control device, the vehicle control method comprising:
acquiring nearby information of an own vehicle;
automatically selecting and executing a first automated driving mode in which lane change is at least partially automatically performed and a second automated driving mode in which lane change is not automatically performed on the basis of the acquired nearby information of the own vehicle; and
causing an output unit to output information prompting switching to manual driving at a position before a branch point when a condition is satisfied, the condition including that during execution of the second automated driving mode there is a branch point for entering a branch road from a main line when the own vehicle is traveling along a predetermined route, wherein the condition includes that other vehicles are not traveling in a lane connected to the branch road, the own vehicle is not traveling in a lane connected to the branch road, or neither other vehicles nor the own vehicle are traveling in a lane connected to the branch road.

* * * * *